(12) United States Patent
Hochi

(10) Patent No.: US 7,754,802 B2
(45) Date of Patent: *Jul. 13, 2010

(54) RUBBER COMPOSITION FOR BEAD AND PNEUMATIC TIRE

(75) Inventor: Kazuo Hochi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 792 days.

This patent is subject to a terminal disclaimer.

(21) Appl. No.: 11/060,791

(22) Filed: Feb. 18, 2005

(65) Prior Publication Data

US 2005/0215692 A1 Sep. 29, 2005

(30) Foreign Application Priority Data

Mar. 24, 2004 (JP) .............................. 2004-087216

(51) Int. Cl.
*B60C 1/00* (2006.01)
*C08K 3/34* (2006.01)
*C08K 3/04* (2006.01)

(52) U.S. Cl. .................. 524/445; 524/447; 524/495; 524/496; 524/571

(58) Field of Classification Search ................. 524/445, 524/447, 495, 496
See application file for complete search history.

(56) References Cited

U.S. PATENT DOCUMENTS

| | | | | |
|---|---|---|---|---|
| 3,269,444 A | * | 8/1966 | Willis | 152/539 |
| 6,598,645 B1 | * | 7/2003 | Larson | 152/548 |
| 6,699,921 B2 | * | 3/2004 | Ikeda | 524/236 |
| 7,174,937 B2 | * | 2/2007 | Hochi | 152/516 |
| 7,222,652 B2 | * | 5/2007 | Hochi | 152/516 |

FOREIGN PATENT DOCUMENTS

| | | |
|---|---|---|
| EP | 0 588 154 A2 | 3/1994 |
| EP | 0 875 532 A1 | 11/1998 |
| EP | 875 532 * | 11/1998 |
| EP | 1 195 402 A1 | 4/2002 |
| EP | 1 195402 * | 4/2002 |
| EP | 1772481 A1 * | 4/2007 |
| JP | 2000-16028 A | 1/2000 |
| JP | 2002-88206 A | 3/2002 |
| JP | 2003-292685 A | 10/2003 |
| JP | 2004-27003 A | 1/2004 |
| JP | 2004-82785 A | 3/2004 |
| WO | WO-01/16221 A1 | 3/2001 |

OTHER PUBLICATIONS

Kaolinite—Wikipedia, 2008.*

* cited by examiner

*Primary Examiner*—Vickey Nerangis
(74) *Attorney, Agent, or Firm*—Birch, Stewart, Kolasch & Birch LLP

(57) ABSTRACT

The present invention provides a rubber composition for a bead, which has excellent processability and is capable of decreasing heat generation while maintaining rubber hardness, and a pneumatic tire having improved balance in fuel efficiency and steering stability. Specifically, the present invention provides a rubber composition for a tire bead comprising (B) 10 to 100 parts by weight of carbon black having nitrogen-adsorbing specific surface area of 30 to 100 $m^2/g$ and dibutyl phthalate adsorption of 40 to 200 ml/100 g, and (C) 5 to 120 parts by weight of a think plate-like natural mineral having aspect ratio of 3 to 30 and average particle size of 2 to 30 μm, based on (A) 100 parts by weight of a rubber component.

6 Claims, No Drawings

RUBBER COMPOSITION FOR BEAD AND PNEUMATIC TIRE

BACKGROUND OF THE INVENTION

The present invention relates to a rubber composition for a bead and a pneumatic tire.

In recent years, demands for fuel efficiency are increasing and low heat generating tires are desired.

As a method to reduce heat generation, there are the method of reducing the amount of carbon black and the method of using carbon black having large particle size. However, in such methods, the hardness of the rubber decreases and as a result, there is the problem that stiffness of the tire decreases.

Particularly, stiffness of the bead is associated with steering performance and is extremely important. Therefore, rubber having extremely high hardness in comparison to other parts of a tire must be used for the bead. Consequently, the above methods are unsuitable for rubber of the bead and steering performance is impaired significantly.

On the other hand, to obtain high hardness, use of oil can be suppressed, but in such a case, viscosity of the compound rises and becomes load in the process. Also, high hardness can be obtained by adding thermosetting resin, but there is the problem that heat generation becomes large.

The method of using rubber containing carbon black and a thin plate-like natural mineral such as sericite in the rubber component for the tire tread in order to improve ozone resistance and performance on ice and for the sidewall of a tire in order to obtain low air permeability is already known (see JP-A-2004-27003). However, the method of using such rubber for the bead to improve balance in fuel efficiency and steering stability is not known.

SUMMARY OF THE INVENTION

The object of the present invention is to provide a rubber composition for a bead, which has excellent processability and is capable of decreasing heat generation while maintaining rubber hardness, and a pneumatic tire having improved balance in fuel efficiency and steering stability.

The present invention relates to a rubber composition for a tire bead comprising (B) 10 to 100 parts by weight of carbon black having nitrogen-adsorbing specific surface area of 30 to 100 m$^2$/g and dibutyl phthalate adsorption of 40 to 200 ml/100 g, and (C) 5 to 120 parts by weight of a thin plate-like natural mineral having aspect ratio of 3 to 30 and average particle size of 2 to 30 μm, based on (A) 100 parts by weight of a rubber component.

The present invention also relates to a pneumatic tire having a clinch apex or a bead apex comprising the rubber composition.

DETAILED DESCRIPTION

The rubber composition for a bead of the present invention comprises a rubber component, carbon black and a thin plate-like natural mineral.

Examples of the rubber component are diene rubbers such as natural rubber (NR), isoprene synthetic rubber (IR), butadiene rubber (BR), styrene-butadiene rubber (SBR), acrylonitrile-butadiene copolymer rubber (NBR), chloroprene rubber (CR), butyl rubber (IIR) and styrene-isoprene-butadiene rubber (SIBR). These diene rubbers can be used alone or two or more kinds can be used together.

Of the rubber component, natural rubber (NR) and/or isoprene rubber (IR) are preferably used from the viewpoint of having low heat generating properties. Furthermore, the total amount of NR and/or IR in the rubber component is preferably at least 20% by weight, more preferably at least 30% by weight. When the total amount is less than 20% by weight, strength at break tends to be poor.

The nitrogen-adsorbing specific surface area (N$_2$SA) of the carbon black is at least 30 m$^2$/g, preferably at least 40 m$^2$/g. When N$_2$SA of the carbon black is less than 30 m$^2$/g, reinforcing properties and abrasion resistance are insufficient. Also, N$_2$SA of the carbon black is at most 100 m$^2$/g, preferably at most 90 m$^2$/g. When N$_2$SA of the carbon black is more than 100 m$^2$/g, dispersibility becomes poor and heat generating properties become high. Examples of the carbon black are HAF and FEF, but are not particularly limited.

The dibutyl phthalate (DBP) adsorption of the carbon black is at least 40 ml/100 g, preferably at least 50 ml/100 g, more preferably at least 80 ml/100 g. Also, the DBP adsorption is at most 200 ml/100 g, preferably at most 180 ml/100 g, more preferably at most 160 ml/100 g. When the DBP adsorption is within this range, mechanical properties and abrasion resistance are excellent.

The amount of carbon black is at least 10 parts by weight, preferably at least 20 parts by weight, more preferably at least 30 parts by weight based on 100 parts by weight of the rubber component. When the amount of carbon black is less than 10 parts by weight, reinforcing properties are insufficient and the rubber strength is insufficient. Also, the amount of carbon black is at most 100 parts by weight, preferably at most 90 parts by weight, more preferably at most 85 parts by weight. When the amount of carbon black is more than 100 parts by weight, heat generation tends to be large.

As the thin plate-like natural mineral, micas such as kaolinite, sericite, phlogopite and muscovite are preferable. Of these, from the viewpoint of excellent balance in hardness and low heat generating properties, sericite is more preferable.

The aspect ratio (ratio of maximum diameter to thickness) of the thin plate-like natural mineral is at least 3, preferably at least 5, more preferably at least 10. When the aspect ratio of the thin plate-like natural mineral is less than 3, sufficient hardness cannot be obtained. Also, the aspect ratio of the thin plate-like natural mineral is at most 30, preferably at most 20. When the aspect ratio is larger than 30, dispersibility in the rubber and strength at break decrease. The aspect ratio is found by measuring the major axis and the minor axis of 50 random particles of the thin plate-like natural mineral observed by an electron microscope and calculating a/b from the average major axis a and average minor axis b.

The average particle size of the thin plate-like natural mineral is at least 2 μm, preferably at least 5 μm, more preferably at least 10 μm. When the average particle size is less than 2 μm, costs for pulverization are high and sufficient rubber hardness cannot be obtained. Also, the average particle size of the thin plate-like natural mineral is at most 30 μm, preferably at most 20 μm. When the average particle size is more than 30 μm, the thin plate-like natural mineral becomes a site for destruction and bending fatigue resistance decreases. Herein, the average particle size refers to the average value of the major axis of the thin plate-like natural mineral.

The amount of the thin plate-like natural mineral is at least 5 parts by weight, preferably at least 10 parts by weight, more preferably at least 15 parts by weight based on 100 parts by weight of the rubber component. When the amount is less than 5 parts by weight, the effects of adding the thin plate-like natural mineral cannot sufficiently be obtained. Also, the amount of the thin plate-like natural mineral is at most 120 parts by weight, preferably at most 80 parts by weight, particularly preferably at most 60 parts by weight. When the amount of the thin plate-like natural mineral is more than 120 parts by weight, dispersing the thin plate-like natural mineral in the rubber becomes difficult and also, heat generation becomes large.

Furthermore, a silane coupling agent can be compounded to the rubber composition of the present invention when necessary.

The silane coupling agent is not particularly limited and sulfide-type, mercapto-type, vinyl-type, amino-type, glycidoxy-type, nitro-type and chloro-type silane coupling agents are used.

Specifically, examples of sulfide-type silane coupling agents are bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthio carbamoyltetrasulfide, 3-triethoxysilylpropyl-N,N-dimethylthio carbamoyltetrasulfide, 2-triethoxysilylethyl-N,N-dimethylthio carbamoyltetrasulfide, 2-trimethoxysilylethyl-N,N-dimethylthio carbamoyltetrasulfide, 3-trimethoxysilylpropylbenzothiazolyltetrasulfide, 3-triethoxysilylpropylbenzothiazoletetrasulfide, 3-triethoxysilylpropylmethacrylatemonosulfide and 3-trimethoxysilylpropylmethacrylatemonosulfide.

Examples of mercapto-type silane coupling agents are 3-mercaptopropyltrimethoxysilane, 3-mercaptopropyltriethoxysilane, 2-mercaptoethyltrimethoxysilane and 2-mercaptoethyltriethoxysilane.

Examples of vinyl-type silane coupling agents are vinyl triethoxysilane and vinyl trimethoxysilane.

Examples of amino-type silane coupling agents are 3-aminopropyltriethoxysilane, 3-aminopropyltrimethoxysilane, 3-(2-aminoethyl)aminopropyltriethoxysilane and 3-(2-aminoethyl) aminopropyltrimethoxysilane.

Examples of glycidoxy-type silane coupling agents are γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of nitro-type silane coupling agents are 3-nitropropyltrimethoxysilane and 3-nitropropyltriethoxysilane.

Examples of chloro-type silane coupling agents are 3-chloropropyltrimethoxysilane, 3-chloropropyltriethoxysilane, 2-chloroethyltrimethoxysilane and 2-chloroethyltriethoxysilane.

These silane coupling agents can be used alone or two or more kinds can be used together.

To the rubber composition for a tire bead of the present invention, oils such as aromatic oil, paraffin oil, castor oil and soya bean oil can be compounded.

Furthermore, besides the rubber component, carbon black, the thin plate-like natural mineral, the silane coupling agent and the oil, additives that are usually used for preparing rubber compositions for tires such as silica, stearic acid, zinc oxide, antioxidants, vulcanizing agents such as sulfur and vulcanization accelerators can be compounded when necessary in the usual amount to rubber composition for a tire bead of the present invention.

As the process for preparing the rubber composition for a tire bead of the present invention, a known method can be employed and for example, there is the method of kneading the above components using a rubber kneading machine such as an open roll or a banbury mixer.

The rubber composition for a tire bead of the present invention obtained in the above manner preferably has complex modulus (E*) measured at 25° C. after vulcanization of at least 8 MPa, more preferably at least 10 MPa. When the rubber hardness is less than 8 MPa, steering stability tends to be poor.

The rubber composition for a tire bead of the present invention is used for the bead members of a tire. Herein, bead members refer to the clinch apex and the bead apex.

The clinch apex and the bead apex can be prepared by the method of laminating a sheet prepared from the rubber composition in a specific shape or the method of extruding the rubber composition by an extruder.

The pneumatic tire of the present invention is prepared by the usual method using the clinch apex or the bead apex prepared from the rubber composition for a tire bead of the present invention.

Hereinafter, the present invention is explained in detail by means of Examples, but the present invention is not limited thereto.

Examples 1 to 2 and Comparative Examples 1 to 3

Materials

NR: RSS #3

BR: BR150B available from Ube Industries, Ltd.

Carbon black: Seast NH (HAF grade, $N_2SA$: 74 $m^2/g$, DBP adsorption:

127 ml/100 g) available from Tokai Carbon Co., Ltd.

Sericite: KM-8 (aspect ratio: 15, average particle size: 17 μm) available from Nippon Forum Co., Ltd.

Zinc oxide: Zinc oxide available from Mitsui Mining and Smelting Co., Ltd.

Stearic acid: Tsubaki available from NOF Corporation

Aromatic oil: Diana Process AH24 available from Idemitsu Kosan Co., Ltd.

Antioxidant: Antigen 6C (N-(1,3-dimethylbutyl)-N'-phenyl-p-phenylenediamine) available from Sumitomo Chemical Co., Ltd.

Wax: SUNNOC N available from Ohuchi Shinko Chemical Industrial Co., Ltd.

Sulfur: Powdery sulfur available from Karuizawa Seirensho K. K. Vulcanization accelerator: Nocceler NS (TBBS: N-tert-butyl-2-benzothiazolylsulfenamide) available from Ouchi Shinko Chemical Industrial Co., Ltd.

(Preparation Process)

The materials other than sulfur and the vulcanization accelerator were kneaded using a Banbury mixer at 150° C. for 3 minutes according to the composition shown in Table 1. The sulfur and the vulcanization accelerator were kneaded to the obtained composition using a roll at 80° C. for 4 minutes to obtain a rubber composition.

A green tire was molded using the rubber composition for the clinch apex and the bead apex and then vulcanized to prepare a test tire (size: 195/65R15). The following tests were conducted for the obtained tire.

(Testing Methods)

<Mooney Viscosity>

The Mooney viscosity of the unvulcanized composition was measured at 130° C. according to JIS K6300. The measured results are shown as an index based on Comparative Example 1 as 100 (standard). The larger the index is the better the processability.

<Complex Modulus (E*)>

E* (MPa) was measured at a temperature of 70° C., initial strain of 10%, dynamic strain of 2% and frequency of 10 Hz using a viscoelastometer made by Iwamoto Corporation.

<Rolling Resistance>

The rolling resistance when the sample tire was run under conditions of a 15×6 JJ rim, inner pressure of 230 kPa, load of 3.43 kN and speed of 80 km/h was measured using a rolling resistance testing machine. The test results are shown as an index based on Comparative Example 1 as 100 (standard). The larger the index is the lower the rolling resistance and the better the fuel efficiency.

<Steering Stability>

The sample tire was mounted on all wheels of an automobile (Japanese FF 2000 cc) and steering stability was evaluated by sensory evaluation by the driver. Evaluation was conducted on a scale of 1 to 10 relative to Comparative Example 1, which was evaluated as 6 (standard). The larger the rating is the better the steering stability.

(Test Results)

The results are shown in Table 1.

TABLE 1

|  | Ex. | | Com. Ex. | | |
| --- | --- | --- | --- | --- | --- |
|  | 1 | 2 | 1 | 2 | 3 |
| Composition (parts by weight) | | | | | |
| NR | 80 | 80 | 80 | 80 | 80 |
| BR | 20 | 20 | 20 | 20 | 20 |
| Carbon black | 60 | 55 | 70 | 80 | 60 |
| Sericite | 20 | 35 | — | — | — |
| Stearic acid | 2 | 2 | 2 | 2 | 2 |
| Zinc oxide | 4 | 4 | 4 | 4 | 4 |
| Antioxidant | 2 | 2 | 2 | 2 | 2 |
| Aromatic oil | 5 | 5 | 5 | 5 | 5 |
| Sulfur | 1.5 | 1.5 | 1.5 | 1.5 | 1.5 |
| Vulcanization accelerator | 3 | 3 | 3 | 3 | 3 |
| Evaluation results | | | | | |
| Mooney viscosity | 106 | 112 | 100 | 79 | 107 |
| E* (MPa) | 10 | 16 | 7 | 14 | 6 |
| Rolling resistance | 101 | 103 | 100 | 95 | 104 |
| Steering stability | 6 | 6.5 | 6 | 6.5 | 5.5 |

In comparison to Comparative Example 1, in Comparative Example 2 wherein the amount of carbon black was increased, the rubber hardness increased and steering stability improved, but processability decreased and fuel consumption increased. In Comparative Example 3 wherein the amount of carbon black was decreased, processability improved and fuel efficiency was excellent, but steering stability decreased as the rubber hardness decreased.

On the other hand, in Examples 1 and 2 wherein sericite was added, the rubber hardness increased, steering stability improved and also processability and fuel efficiency were excellent.

According to the present invention, a pneumatic tire can be obtained, which has excellent processability and improved balance in fuel efficiency and steering stability while maintaining rubber hardness.

What is claimed is:

1. A pneumatic tire having a clinch apex or a bead apex, said clinch apex or bead apex being formed from a rubber composition comprising:
   (B) 10 to 100 parts by weight of carbon black having nitrogen-adsorbing specific surface area of 30 to 100 $m^2/g$ and dibutyl phthalate adsorption of 40 to 200 ml/100 g, and
   (C) 15 to 120 parts by weight of at least one member selected from the group consisting of kaolinite, sericite, phlogopite, and muscovite having an aspect ratio of 3 to 30 and average particle size of 5 to 30 μm,
   based on (A) 100 parts by weight of a rubber component.

2. The pneumatic tire of claim 1, wherein the carbon black is present in an amount of 30 to 85 parts by weight, and the member is present in an amount of 15 to 60 parts by weight, based on 100 parts by weight of the rubber component.

3. The pneumatic tire of claim 1, wherein the member has an aspect ratio of 10 to 20 and average particle size of 10 to 20 μm.

4. The pneumatic tire of claim 1, wherein the carbon black has a nitrogen-adsorbing specific surface area of 40 to 90 $m^2/g$ and dibutyl phthalate adsorption of 80 to 160 ml/100 g.

5. The pneumatic tire of claim 2, wherein the member has an aspect ratio of 10 to 20 and average particle size of 10 to 20 μm.

6. The pneumatic tire of claim 5, wherein the carbon black has a nitrogen-adsorbing specific surface area of 40 to 90 $m^2/g$ and dibutyl phthalate adsorption of 80 to 160 ml/100 g.

\* \* \* \* \*